United States Patent [19]
Watts

[11] Patent Number: 5,468,525
[45] Date of Patent: Nov. 21, 1995

[54] SPIRAL COILS SUITABLE FOR CUSHIONING USE

[75] Inventor: Ridley Watts, Gates Mills, Ohio

[73] Assignee: Patriot Packaging Corporation, Stow, Ohio

[21] Appl. No.: 97,362

[22] Filed: Jul. 23, 1993

Related U.S. Application Data

[60] Division of Ser. No. 861,247, Mar. 31, 1992, Pat. No. 5,257,492, which is a continuation-in-part of Ser. No. 681,087, Apr. 5, 1991, Pat. No. 5,181,614.

[51] Int. Cl.$^6$ .................................................. B65D 55/30
[52] U.S. Cl. ..................... 428/34.1; 428/371; 428/906; 428/369; 428/402; 428/37; 428/34.2; 428/36.3; 428/119; 428/121; 428/124; 206/521; 206/584; 206/814
[58] Field of Search ........................... 428/371, 906, 428/369, 402, 37, 34.2, 36.3, 119, 34.1, 121, 124; 206/521, 584, 814

[56] References Cited

U.S. PATENT DOCUMENTS

| | | | |
|---|---|---|---|
| 390,442 | 10/1888 | Brigham | 493/352 |
| 425,042 | 4/1890 | Moseley et al. | 428/184 |
| 727,055 | 5/1903 | Arnold | 428/368 |
| 2,297,368 | 8/1940 | Ruppl et al. | 53/435 |
| 2,924,154 | 8/1957 | Russell et al. | 493/464 |
| 3,047,136 | 7/1962 | Graham | 206/584 |
| 3,074,543 | 1/1963 | Stanley | 493/360 |
| 3,347,036 | 10/1967 | Daniel | 428/371 |
| 3,347,136 | 10/1967 | Kure | 493/360 |
| 3,481,455 | 12/1969 | Graham et al. | 206/523 |
| 3,650,877 | 3/1972 | Johnson | 428/222 |
| 3,655,500 | 4/1972 | Johnson | 428/126 |
| 3,723,240 | 3/1973 | Skochdopole et al. | 428/369 |
| 3,852,152 | 12/1974 | Werner et al. | 428/338 |
| 4,005,569 | 2/1977 | Corbiere | 428/369 |
| 4,042,658 | 8/1977 | Collins | 264/45.5 |
| 4,247,289 | 1/1981 | McCabe | 493/386 |
| 4,566,831 | 1/1986 | Groth | 410/117 |
| 4,800,708 | 1/1989 | Sperry | 53/449 |
| 4,839,210 | 6/1989 | Komaransky et al. | 428/77 |
| 5,035,104 | 7/1991 | Helling et al. | 53/441 |
| 5,088,972 | 2/1992 | Parker | 493/352 |
| 5,097,879 | 3/1992 | Rice, Sr. | 144/176 |
| 5,181,614 | 1/1993 | Watts | 206/584 |
| 5,257,492 | 11/1993 | Watts | 53/430 |
| 5,261,469 | 11/1993 | Severson | 144/176 |

FOREIGN PATENT DOCUMENTS

747107  11/1966  Canada.

Primary Examiner—William P. Watkins, III
Attorney, Agent, or Firm—Watts, Hoffmann, Fisher & Heinke

[57] ABSTRACT

Coils for use as cushioning, such as dunnage, made from spiral coils of paper that are recyclable and biodegradable, or from other thin, flexible, resilient strips. The coils are cylindrical or cylindrical with a transverse fold, and when used as dunnage are randomly oriented to provide cushioning for packaged articles.

12 Claims, 7 Drawing Sheets

SPIRAL COILS SUITABLE FOR CUSHIONING USE

RELATED APPLICATION

This application is a division of application Ser. No. 07/861,247 filed Mar. 31, 1992, now U.S. Pat. No. 5,257,492, issued Nov. 2, 1993, which is a continuation-in-part of application Ser. No. 07/681,087 filed Apr. 5, 1991 now U.S. Pat. No. 5,181,614, issued Jan. 26, 1993.

FIELD OF INVENTION

This invention relates to spiral coils suitable for cushioning uses, such as improved dunnage, animal bedding and the like.

BACKGROUND OF INVENTION

It is common to protect articles being shipped in containers by filling extra space in the container with so called dunnage to isolate the articles from the container walls and inhibit movement of the articles within the container. Retailers, and especially those who specialize in catalog sales, typically use boxes that are not specifically designed in size or shape for particular articles and therefore they include substantial amounts of packing or dunnage in the boxes along with the article or articles shipped to reduce the risk of breakage.

Cushioning dunnage, such as excelsior, shredded newsprint, and the like has been in long use. More sophisticated materials and forms have also been proposed, such as the helical coil-like or tubular-like dunnage made from paper web shown in U.S. Pat. No. 3,650,877, or helically convoluted synthetic strands as shown in U.S. Pat. No. 3,347,036. Recent popular materials are plastic bubble sheets, particles or shapes of materials such as polystyrene, and other open-or closed-cell foamed materials.

All packaging is coming under attack because of disposal problems, especially due to the lack of adequate landfill facilities and the non-biodegradable properties of the popular plastic packing materials. The quantity of plastic dunnage used in packaging is so great, and the ability to recycle it is so poor, that the disposal problem is becoming unmanageable. While some industrial uses of polystyrene particles, to take one current example of a widely used dunnage material, permit collection and reuse, the great majority of such material is used for packing retail products that are widely distributed directly to consumers, who individually never receive enough to justify collection and recycling; yet in total, the amount of polystyrene packing used is making its disposal a major problem. The same is true of bubble pack. A further problem with such materials is the space they require for storage prior to use. The nature of the plastic dunnage is such that it takes as much space while stored as it does in use. Retailers and especially mail-order houses, find it necessary to provide large rooms or warehouses merely to hold the dunnage needed for shipping their products. This adds substantially to the packaging costs. Some of the non-plastic dunnage used, such as shredded newsprint, lacks structural strength and is easily compressed, and is disliked by retailers and customers because of the dirt and mess associated with its use, as well as the space it occupies unless the retailer does its own shredding, which still involves a less desirable packing operation than dispensing small plastic particles into a package.

SUMMARY OF THE INVENTION

The present invention overcomes the storage problem, the disposal problem and the difficulties in packing with shredded material. It provides low cost, small size, coils suitable for cushioning, such as dunnage, animal bedding or the like, that can be formed and directly dispensed where used, e.g., into packages by a retailer. In its preferred form, the coils are made of recycled material, can again be recycled, and are biodegradable. The material is extremely compact before being formed and after use the coils can be compressed in volume to a small fraction of their volume as used.

A principal use of the coils is for dunnage. The dunnage is small, resilient, spiral coils of thin, flexible, resilient strips, most advantageously paper strips, randomly oriented in a container to fill unused space, retard relative movement of an article within the container, and typically also at least in part to isolate the article from the container walls and thereby cushion fragile articles against shock.

Convolutions of the strips forming the coils are preferably closely adjacent one to the next and provide rigidity in the axial direction, and they surround an open central area that facilitates transverse distortion, but with resilience due to the inherent properties of the paper. Optionally, a transverse fold can be formed in the coil, either perpendicular to the coil axis or at an angle to the axis, to reduce axial rigidity and to vary the manner in which the randomly oriented coils interrelate. A variety of the shapes can be used together in a single package, which variety as well as the proportions of the different constructions used varies the cushioning characteristics of the dunnage.

The preferred manner of forming the coils is to modify a length of paper in a manner to cause it to coil, then separate it into strips and sever the coils; thereafter, if desired, creasing the coils transversely. Most advantageously, one side of the paper is stretched to cause it to coil.

Apparatus is provided for modifying the paper by stretching one side of the paper by bending it across a rigid edge, applying force and moving the paper across the edge. The modified paper is cut into strips that then curl to form the coils. Advantageously, the paper is initially in the form of a rolled web and is continuously fed and stretched across a narrow rigid edge, slit in its direction of travel by rotary cutters and cut transversely to desired length by a shear, so as to fall directly into a shipping carton on a platform or conveyor below the shear, thereby avoiding any need for storing the formed dunnage.

This invention has the advantages of being ecologically sound because the paper used is preferably fully or partially recycled and is recyclable after use and is biodegradable, lower in cost than bubble wrap, styrene "peanuts" or the like, and paper wadding, and is without static cling. Hard wound rolls of kraft paper store in a fraction of the space that would be required for styrene dunnage that would fill the same capacity as the spiral coils made from the roll. By controlling the degree to which the paper coils, as by varying the tension on the web and/or the force applied against the edge across which the web is drawn, which regulates the diameter of the coils, and by varying the length of the strips that form each coil, the softness or firmness of the coils and the bulk density can be changed to suit the needs of the articles being packaged. The number of cutting cycles performed can be easily coordinated with step-by-step advance of a conveyor moving cartons beneath the coil-forming machine to control the amount of dunnage dispensed into each carton, allowing a mix of carton sizes to be handled through pre-programmed control of the conveyor feed.

In its broad aspects the present invention relates to coils for use as cushioning, said coils each being wound in a loose coil shape having overlapping, unsecured, convolutions, each convolution at least partially overlapping all preceding convolutions. It also relates to dunnage for cushioning articles in a container, comprising a plurality of randomly oriented annular spiral coils of thin, flexible, resilient strips, substantially rigid in the axial direction of the spiral and substantially resilient in directions transverse to the axial direction, said coils having overlapping, unsecured, convolutions, and the convolutions of each coil having a common axis.

The invention also relates to coils of thin, flexible, resilient strips as described above, formed by feeding along a path a length of thin, flexible, resilient material and modifying the length of material along the path to cause the modified length to coil when unrestrained. More particularly, the convolutions of the coils are formed by bending the web against and moving it across a narrow rigid surface with sufficient force and tension to cause the web to coil when unrestrained. Thus in its broad aspects the invention relates to coils for use as cushioning, each coil wound in a loose coil shape having overlapping, unsecured, convolutions, each convolution at least partially overlapping all preceding convolutions, the convolutions being formed by bending the web against and moving it across a narrow rigid surface with sufficient force and tension to cause the web to coil when unrestrained.

Where desired, an advantageous transverse fold or crease is formed in the coil creating a bend in the coil and a variation in the size of the central area between the ends of the coil.

BRIEF DESCRIPTION OF THE DRAWINGS

Preferred embodiments of the invention are shown in the accompanying drawings, in which.

DESCRIPTION OF PREFERRED EMBODIMENTS

Figure 1:
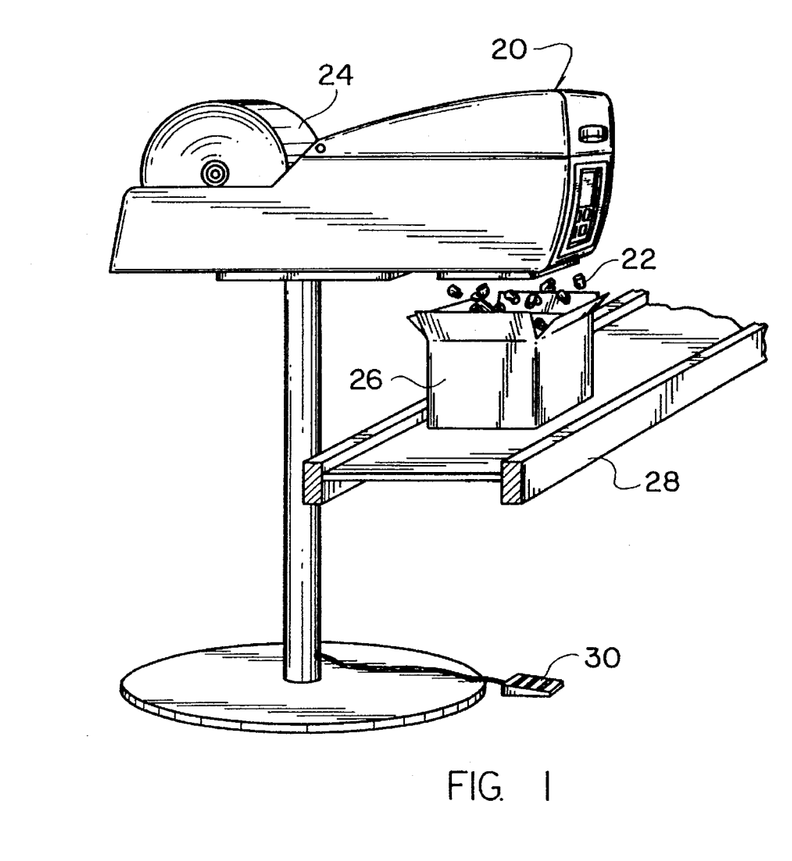
FIG. 1 is a perspective view of apparatus for forming and dispensing spiral coils of the invention for use as dunnage.
Figure 2:
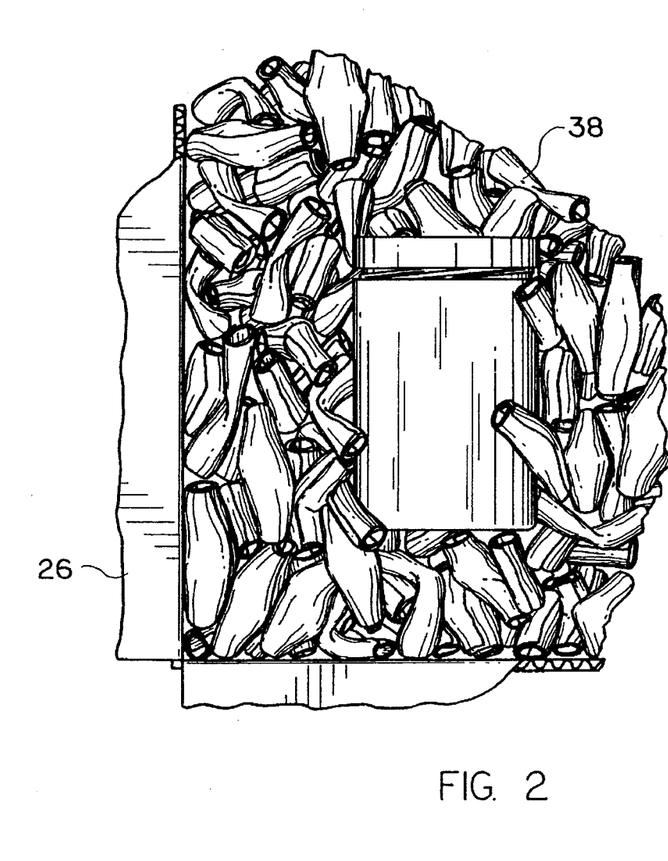
FIG. 2 is a partial top view of a partially filled, open package, diagrammatically indicating the manner in which spiral coils are randomly contained to protect a fragile article in a container.

With reference to the drawings, a machine 20 is shown in FIG. 1 for forming spiral coils 22 from a roll of paper 24 and for depositing the coils directly into an open box 26 on a support 28 beneath the machine. The support 28 in the embodiment shown accommodates the sliding of the box to proper position. Typically, where random sized boxes are being used and the articles being packaged are fragile, an operator will dispense a layer of dunnage in the form of the coils, place an article or articles in the box, and then fill the remaining volume with additional dunnage, thereby isolating the packaged article from the walls of the box, as diagrammatically illustrated in FIG. 2. The forming and dispensing of the coils is advantageously controlled by a foot switch 30. For applications where continuous packaging of similar items in boxes of uniform size is desired, two machines 20 can be used in tandem and the support 28 can be in the form of a conveyor, moving the boxes to a first machine that dispenses a layer of coils, then to a station between the two machines where an article or articles are placed in the box, and then to the second machine where the box is filled with coils. In that type of operation, the machines can be set to automatically form and dispense a predetermined quantity of coils each time a container is detected at the machine station. Because the coils are formed as they are used, no storage of bulky dunnage is required.

Figure 4A:
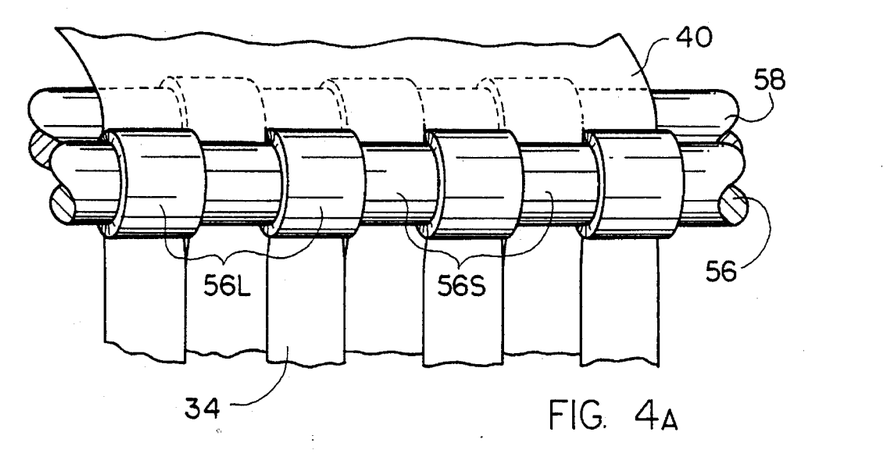
FIG. 4A is a partial perspective view of a web drive and slitting mechanism taken along the line 4A—4A of FIG. 3, with parts omitted, showing a part of the slitting apparatus and diagrammatically indicating the slitting of a length of paper.
Figure 4B:
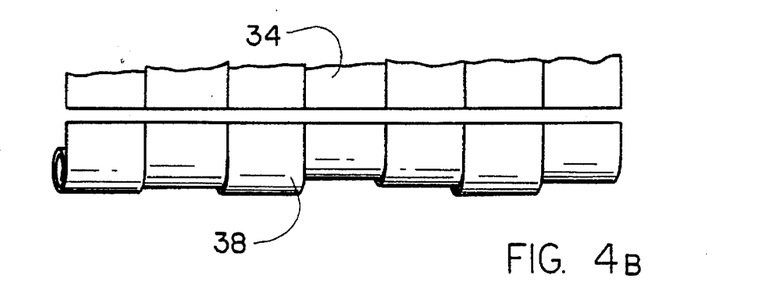
FIG. 4B is a partial perspective view, taken along the line 4B—4B of FIG. 3, of the coils severed from the strips of paper formed by the slitting apparatus.
Figures 5, 6A:
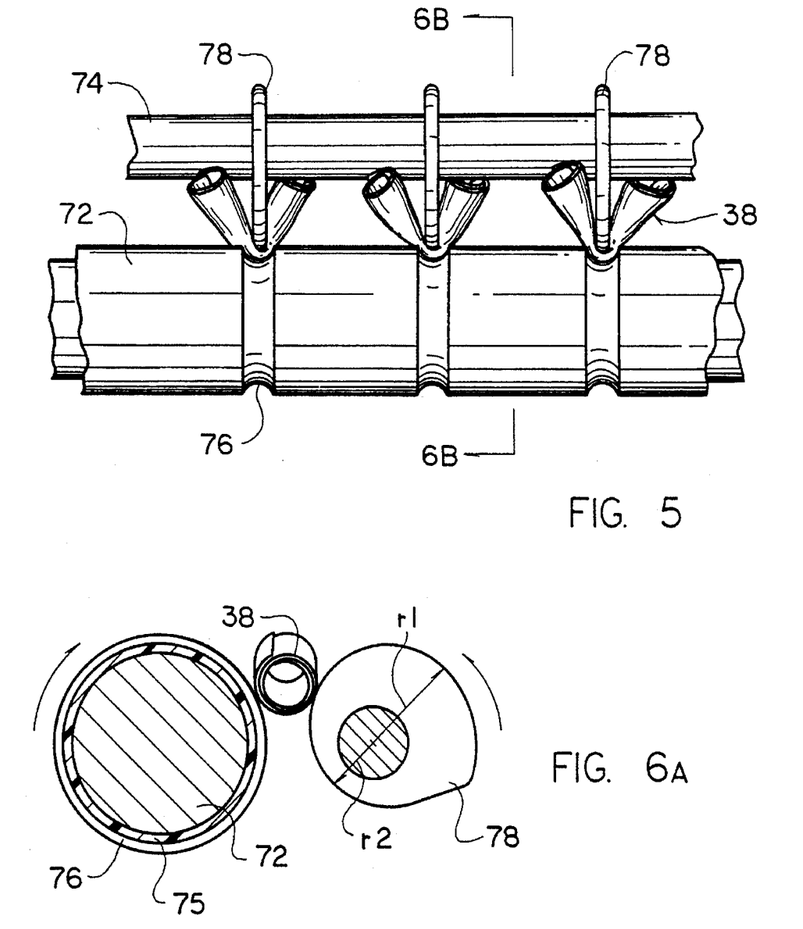
FIG. 5 is a top view taken along the line 5—5 in FIG. 3, showing a creasing mechanism and diagrammatically illustrating the folding of coils.
FIGS. 6A and 6B diagrammatically show the manner in which a coil of paper is received and then creased by the mechanism of FIG. 5, with FIG. 6B being taken along the line 6B—6B of FIG. 5.
Figure 7A:
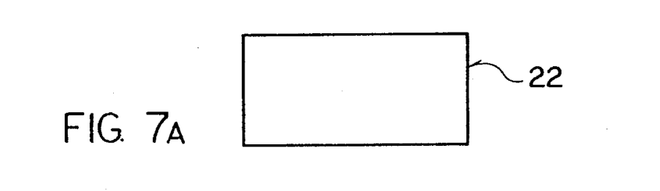
FIGS. 7A and 7B are front and perspective views, respectively, of a cylindrical coil constructed in accordance with the present invention.
Figure 7B:
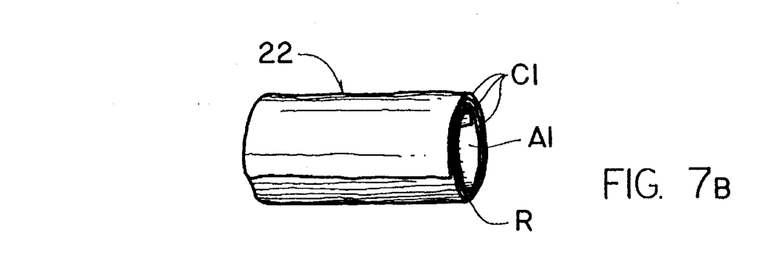

The coils 22 are formed of a strip 34 of paper (FIG. 4 and FIG. 7B) convolutely coiled into a spiral. Preferably, convolutions C1 of the strip are closely adjacent one to the next and a central area A1 surrounded by the convolutions is large in the transverse direction relative to the thickness of a ring R formed by the convolutions C1. The thickness of the ring is sufficient to provide substantial axial strength or rigidity to the coil, while the inherent flexibility of the paper, along with the thickness of the ring and the relatively large central area A1 provides transverse resilience and "give," so that together those properties along with the random orientation of the coils in a container provide good isolation and cushioning of packaged articles. However, the convolutions can be more uniformly spaced throughout the area within the outer circumference of the coil. A preferred spiral coil 22 is made of a strip of 30 to 100 pound basis weight kraft paper (virgin, recycled, or a combination), between ¾ inch and 2½ inches wide and between about 3 and 10 inches long. The outside diameter of the coil is between about ⅜ and ⅝ inch. Coils of these dimensions are useful for protecting articles having a large variation in size and weight. Of course, greater stiffness and larger coils can be achieved if necessary by using heavier paper, longer and wider strips and controlling the outside diameter by varying the extent to which the paper is modified to cause it to coil, or conversely, softer and smaller coils can be achieved in the opposite manner.

Figure 8A:
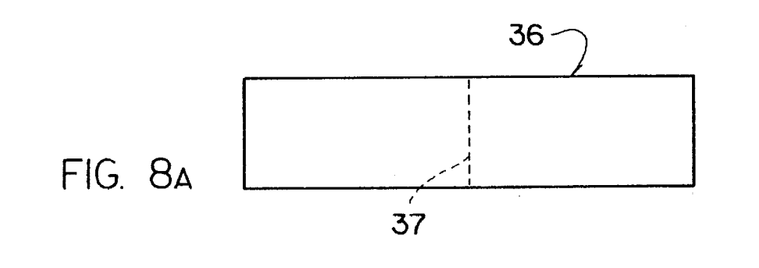
FIGS. 8A and 8B are front and perspective views, respectively, of a cylindrical coil having a transverse fold or crease that is perpendicular to the axis of the coil and constructed in accordance with the present invention.
Figure 8B:
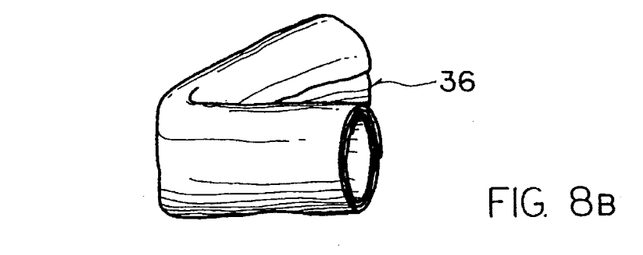
Figure 9A:
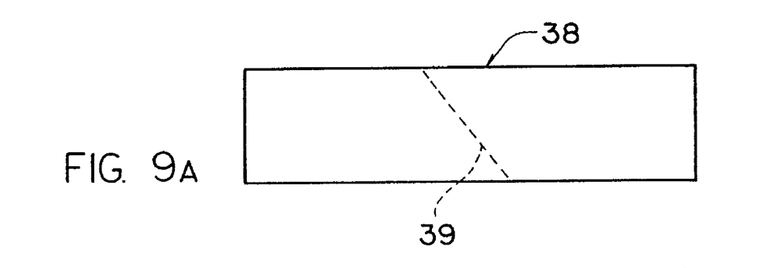
FIGS. 9A and 9B are front and perspective views, respectively, of a cylindrical coil having a transverse fold or crease that is oriented at an angle not perpendicular to the axis of the coil and constructed in accordance with the present invention.
Figure 9B:
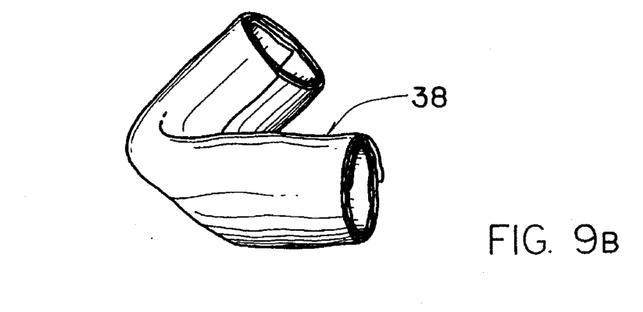

In accordance with the invention, the characteristics of the coils are modified in two additional embodiments 36 and 38, shown in FIGS. 8A, 8B and 9A, 9B, respectively. These coils are approximately twice as long as the coil 22, but otherwise are identically formed before modification. Each is then folded or creased centrally of the ends, transversely of the coil axis as indicated by the dotted lines 37, 39, resulting in a bent shape as shown in FIGS. 8B and 9B. The fold 37 is perpendicular to the coil axis and results in the two portions 36a and 36b being angularly related in a common plane to which the fold is perpendicular. The fold 39 is at other than a 90 degree angle to the axis of the coil, between 30 and 60 degrees and preferably 45 degrees, resulting in the two portions 38a and 38b being angularly related in a common plane to which the fold 39 is not perpendicular. In the preferred embodiments, the angle at the fold is between about 90 and 140 degrees. As a result of the fold, the area within the ring of convolutions varies axially of the coil, being substantially eliminated at the fold and at a maximum and substantially circular in shape at the ends. These modified shapes do not have the direct column strength along their length that the cylindrical shape shown in FIGS. 7A and 7B has and interact with one another or with the other embodiments differently when randomly oriented in a container than do the cylindrically shaped coils. For example, the two angularly related portions 36a, 36b or 38a, 38b when compressed toward each other not only have give and resilience through distortion of the cross sectional shape, but also through changes in the angle between the two angularly related portions. In addition, with the angular fold 39, it is unlikely that either of the portions 38a, 38b will experience or effectively resist direct column loads, but will have greater transverse resistance to compressive loads at the central area where the fold is located. Thus, they may function with more uniformity; i.e., their resistance to load may not vary as greatly in different directions as the cylindrical shapes. The different shapes can be blended in varying proportions within a container to obtain different cushioning characteristics.

Apparatus for forming coils 22, 36 and 38 is shown in FIGS. 3–6. As shown, a roll 24 of kraft paper or other suitable paper, such as recycled paper, is rotatably supported so a continuous web 40 of the paper can be drawn from the roll and formed into coils. The web has a width sufficient to form several coils simultaneously, as shown in FIGS. 4A and 4B. While the web shown in FIG. 4A illustrates seven strips side-by-side, that is by way of a preferred example only and the number may vary depending upon the production desired. In FIG. 4B, the strips are shown just after coiled portions have been cut from the strips, and from that location will fall through a discharge opening of the machine or will first be folded and then discharged. The coils in FIG. 4B are located in the relationship they would have to the strips they are cut from in FIG. 4A, but the cutting mechanism that would be located between what is shown in the two figures is omitted.

Figure 3:
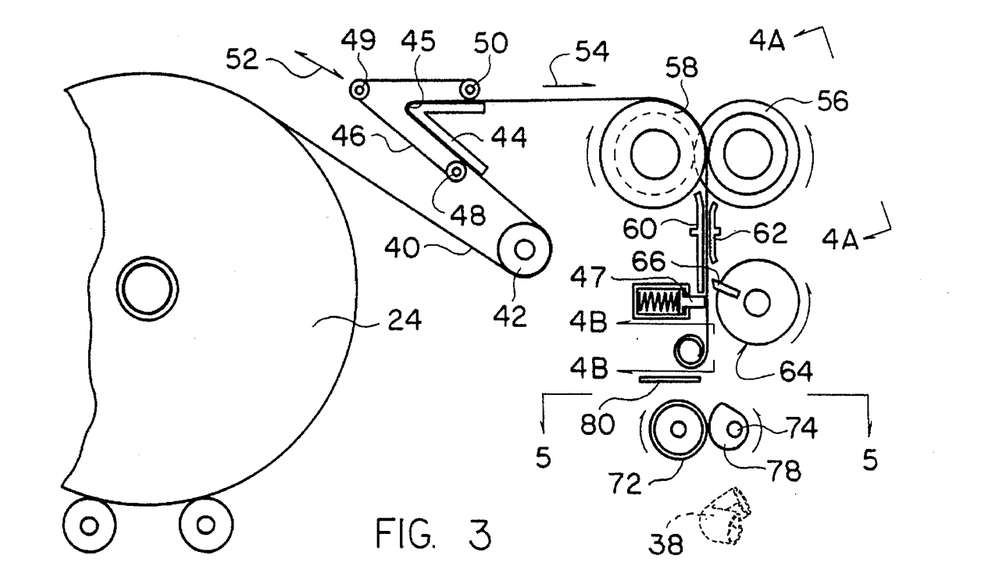
FIG. 3 is a diagrammatic view of apparatus for forming the coils.

The web is tensioned by an idler roll 42 and is bent over a V-shaped plate 44 that extends the width of the web. The apex of the V over which the web travels forms a narrow, but not cutting-sharp, rigid edge 45. The web is tensioned across the edge by an endless belt 46 that is as wide as the plate 44 and is entrained about three guide rolls 48, 49 and 50. The belt is in part in contact with the opposite side of the web from the web surface that slides across the plate and to that extent follows the contour of the web and V-shaped plate. This is assured by the placement of the rolls as shown in FIG. 3, owing to the close proximity of rolls 48, 50 to the surfaces of the plate. Tension on the belt is adjusted by the roll 49, which is movable in the direction of the arrow 52. By virtue of the belt tension against the web and across the edge 45, the belt is moved with the web by friction and applies force to the web against the edge 45.

The web 40 is moved in the direction of the arrow 54 by two driven rolls 56, 58 that slit the web into strips 34 extending in the direction of web travel. As shown in FIG. 4A, the rolls have alternating larger and smaller diameter portions (shown at 56L and 56S on roll 56), each equal in length to the width of the strips to be cut. The larger diameter portions of each roll nest with the smaller diameter portions of the other with a small clearance and shear the web at the junctures to form strips as the web is pulled through the nip of the rolls, which are spaced closely together to frictionally engage the strips.

Guides 60, 62, directly below the rolls 56, 58, on opposite sides of the strips and closely spaced apart, allow the strips to move downward while preventing the strips from coiling. At the lower terminus of the guides, a cutting mechanism 64 severs the strips at a desired length. Those portions below the guides and cutting mechanism are allowed to coil, forming a spiral coil, preferably with closely adjacent convolutions and an open central area that is large relative to the thickness of the ring formed by the convolutions.

Figure 6B:
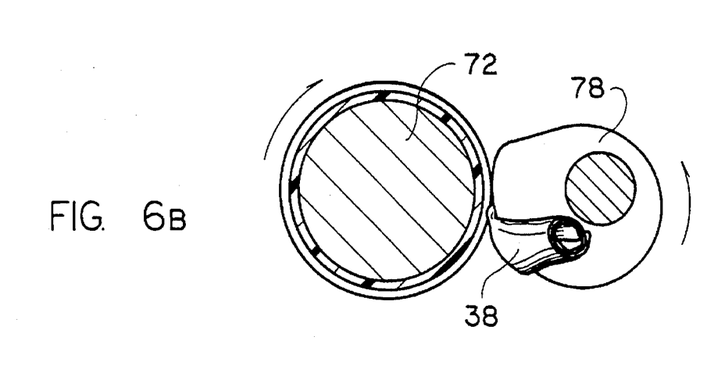

The cutting mechanism 64 utilizes a straight or slightly angled blade 66 that is on one side of and extends the width of the strips and is supported for rotation that will bring it into cutting contact with the strips. A non-rotatable blade 67 extends the width of the strips on the opposite side of the strips from the blade 66. The rotatable blade 66 acts against the blade 67 to shear the strips across the entire width of side-by-side strips. The blade 67 is supported for limited movement in the plane of the blade and is yieldably held in its operating position so that the two blades can properly cooperate to sever the coils from the strips as the rotatable blade is brought into contact with the strips. The blade 46 is rotated through one complete revolution each time the strips advance a desired distance past the cutting station, e.g., six to ten inches. Rotation is accomplished by a one-revolution drive, such as a reciprocatable rack and a driven pinion with a pawl and ratchet wheel connection to the shaft for one-direction rotation, or a single revolution clutch, the operation of which is timed from the rotation of the rolls 56, 58 that advance the web.

Where it is desired to fold or crease the coils to form the embodiments of FIGS. 8A, 8B or 9A, 9B, a folding mechanism 70 is located beneath the cutting mechanism 47, aligned to receive severed coils, fold them, and discharge them from the machine. As shown in FIGS. 3–6B, a side-by-side roll 72 and shaft 74 in a common horizontal plane extend the width of the strips 34, parallel with the coils and located to receive the coils between them. The roll 72 is of metal, coated with, or covered by a sleeve of, resilient material 75, such as plastic or rubber, and preferably has peripheral grooves 76. The roll 72 is larger in diameter than the coils 36 or 38, shown in FIGS. 8A and 9A. The shaft 74 has spaced cam-like discs 78 eccentrically disposed, each with a major radius r1 that extends just to or only slightly into opposed grooves 76, but out of contact with the surface of the roll 72. Each disc has a minor radius r2 that is located approximately 180 degrees from the major radius and that terminates substantially short of the surface of the roll 72, but close enough that the coils will not pass between the discs and the roll. The roll and shaft are counter-rotating as indicated by the directional arrows in FIG. 3 and rotation is continuous during operation of the machine. When a coil drops from the cutting mechanism it falls to a position shown in FIG. 6A, where it is supported by a disc and back-up roll and is pressed against the back-up roll as the disc and back-up roll counter rotate to bring the progressively larger radius portions of the disc into closer proximity to the roll 72, carrying the coil with them, folding or creasing the coil against the back-up roll and bending the end portions away from the roll, in part aided by the grooves 76. The roll and disc frictionally carry the creased or folded coil through the nip and discharge it below, as illustrated in FIG. 6B. In some cases, the coil may not land or stay parallel to the roll and shaft, but rather tip to one side or the other. In that case, the discs will form the fold at an angle to the coil axis as illustrated at 39 in FIGS. 9A and 9B instead of perpendicular to the axis as illustrated at 37 in FIGS. 8A and 8B.

Where it is desired to assure that the coils are tilted when received in the nip of the roll 72 and the discs 78, a thin rod 80 (FIG. 3) or the like is positioned in the path of each falling coil, beneath the cutting mechanism 64 and above the folding mechanism 70, adjacent one end of each coil so as to delay the downward movement of one end long enough to tip the axis of the coil from the horizontal, to approximately a 45 degree angle. The discs, especially at the edge surface portion leading into the major radius section, may be serrated or have a coating of high coefficient of friction to assure that the coils are pulled into the nip of the discs and back-up roll.

In operation, the driven rolls 56, 58 pull the web 40 from the roll 24 across the edge 45, slit the web into strips 34, and advance the strips to the cutting mechanism 64. The web is tensioned across the edge 45 by the idler roll 42, the pulling force of the drive rolls 56, 58, and the belt 46, which retards web movement owing to the fact that the belt is driven through frictional engagement with the web. In addition, the belt applies a force to the web in the direction of the edge to bend it sharply over the edge. As a result of the pulling and bending of the web across the edge, the opposite surface of the web from the one in direct contact with the edge is stretched relative to the surface in contact. This modifies the web in a manner that causes it to coil when the web tension is released and the web is not constrained, as when it exits the guides 60, 62 and the directly adjacent cutting mechanism 64. The individual coils that form beneath the cutting mechanism are concurrently cut from the supporting strips at intervals that are coordinated with the strip travel so that the coils are formed with a desired strip length to provide the desired strength and resilience to the coils. The coils are then discharged in cylindrical form or are folded in the manner described immediately above.

Figure 10:
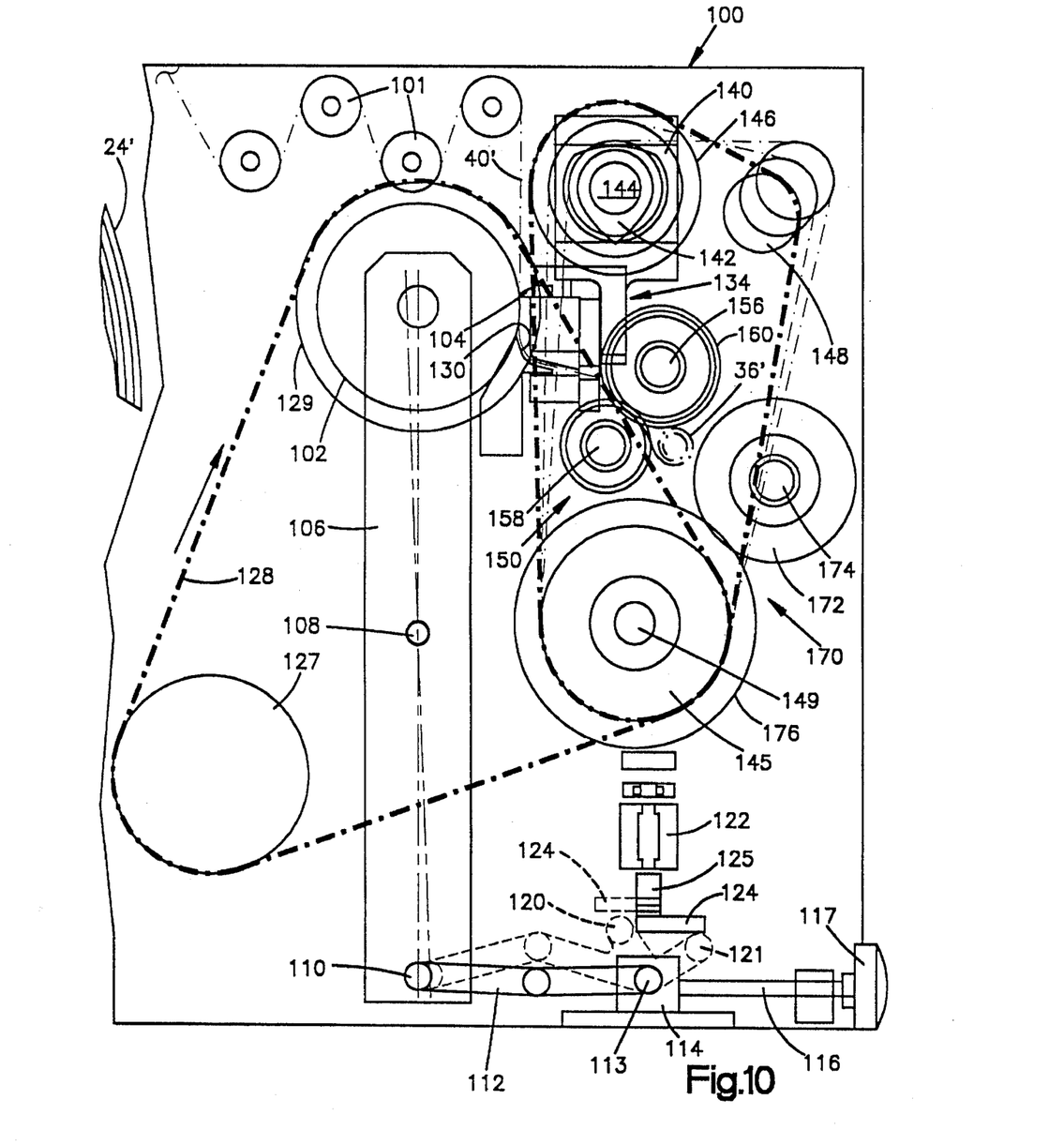
FIG. 10 is a diagrammatic side elevational view of a second embodiment of apparatus for forming the coils.
Figure 10A:
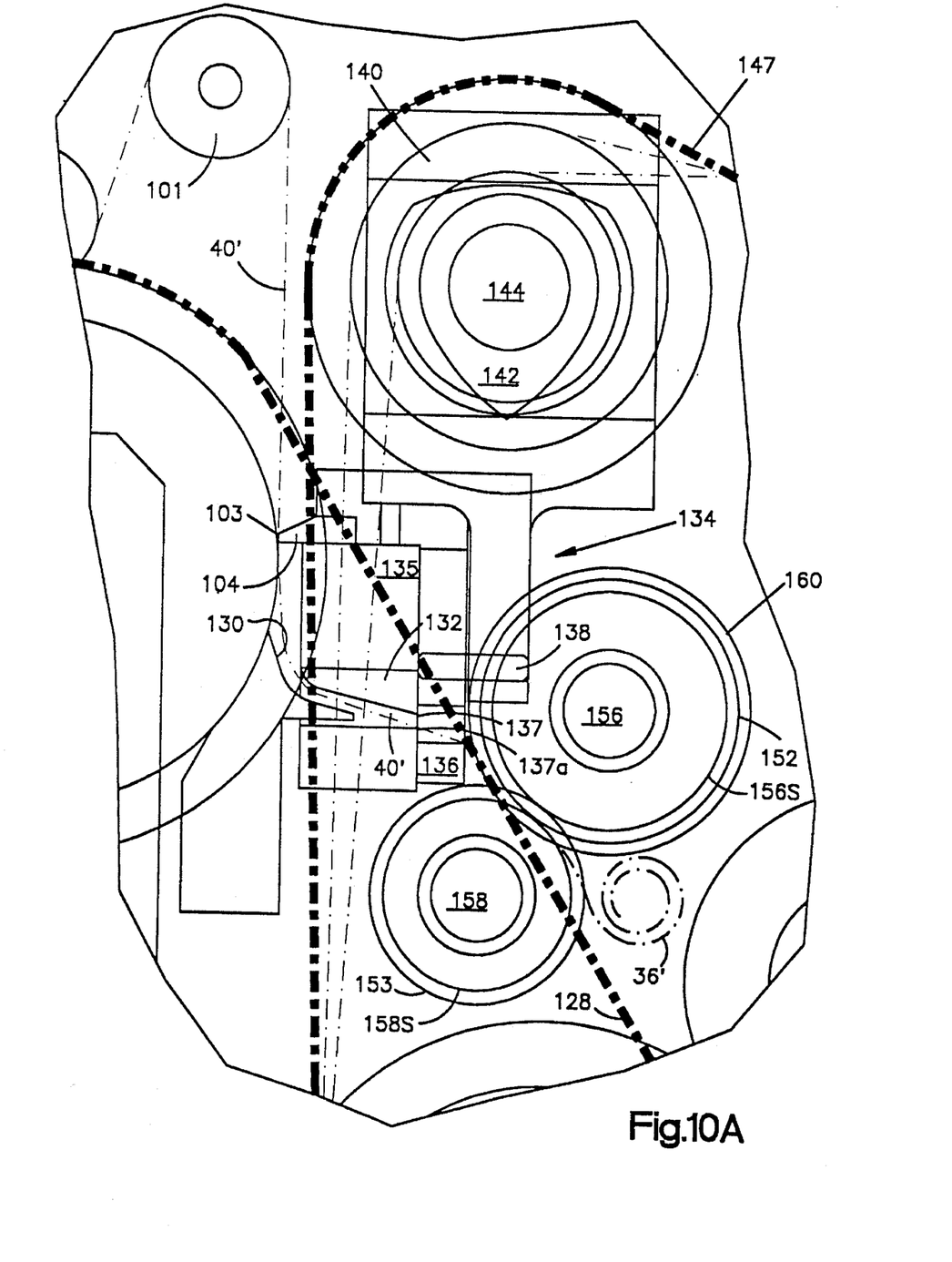
FIG. 10A is an enlarged portion of FIG. 10.
Figure 11:
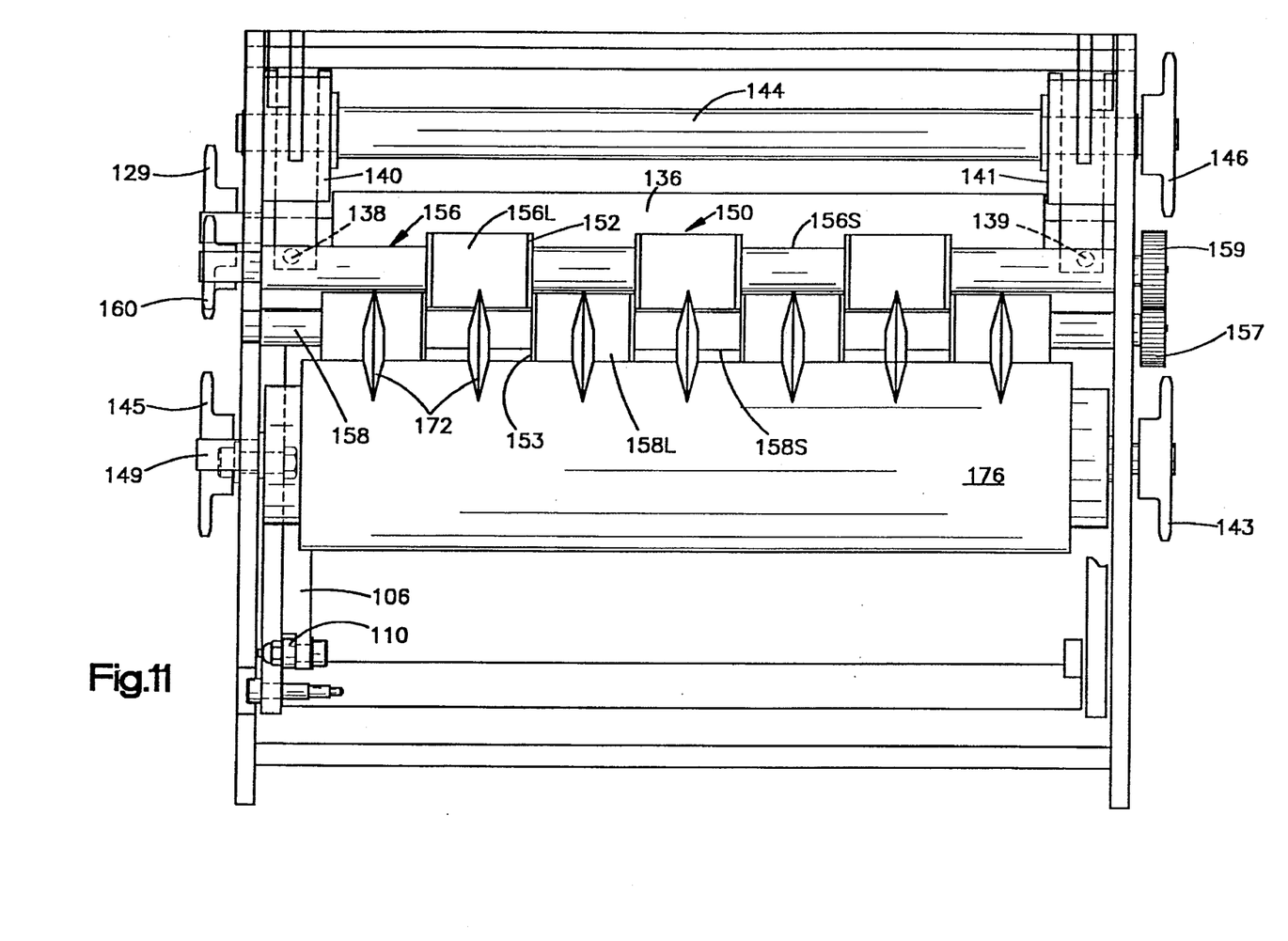
FIG. 11 is a front elevational view of the apparatus of FIG. 10 taken from the right side of FIG. 10.

A second apparatus 100 for forming the coils of the invention is shown in FIGS. 10 to 11 of the drawings. In this embodiment, a roll of kraft paper 24' or other suitable material, such as recycled paper, is rotatably supported by the apparatus so a continuous web 40' can be drawn from the roll and formed into coils. The web has a width sufficient to form several coils simultaneously, as in the first embodiment described. The web is festooned and tensioned by idler rolls 101 as it leaves the roll and travels through a nip between a driven roll 102 and a narrow edge 103 of a fixed rigid blade 104. The driven roll and the blade extend the width of the web 40'. The roll has a resilient surface, e.g., polyurethane of light durometer, such as 30 to 50 durometer, and a greater coefficient of friction than the edge 103 of the blade. The roll is supported at the top of a frame 106 that is pivoted about a shaft 108 between the top and bottom of the frame. The lower end of the frame is connected to one end 110 of an over-center toggle mechanism 112. The toggle mechanism is connected at an opposite end 113 to a support nut 114 adjustable along a threaded adjusting rod 116 operated from outside the machine housing by an adjustment knob 117. An elbow link 118 at the end 113 has operating arms 120, 121 selectively operated by a linear actuator, such as a solenoid 122 having a laterally extending finger 124 at the end of a reciprocable rod 125. The solenoid is constructed to extend and retract the rod each time the solenoid is energized and to rotate the rod 180 degrees (one cycle), so that actuations of the solenoid alternately open and close the toggle because the solenoid automatically acts alternately on the operating arms 120, 121. Each time the machine is operated to rotate the driven roll 102 through the motor driven sprocket 127, chain 128 and sprocket 129 on roll 102, the solenoid is energized for one cycle, the finger 124 contacts the arm 120 and the toggle is closed, pivoting the frame 106 to bring the roll 102 (now rotating) and web 40' against the edge 103 of the fixed blade 104. Each time the operation of the driven roll is stopped, the solenoid is energized for one cycle, the finger 124 contacts the arm 121 and the toggle is opened, moving the roll away from the blade. This not only automatically facilitates the infeed of the web from a new roll of paper through the nip of the drive roll 102 and blade 103, but also avoids having to start each operation of the machine with the roll under the load induced by the pressure between the roll and blade, allowing the use of a smaller drive motor. Because the end 113 of the toggle remains in its adjusted position unless purposefully changed by operation of the knob 117, the roll 102 is always returned to its former position each time coils are formed, applying the same force to the paper gripped between the roll and blade and thereby producing coils of the same size and density as before.

The roll 102 deforms inwardly when it presses the web 40' against the narrow edge 103 of the blade 104. The narrow blade edge is preferably smooth so as not to cut the web, and is rounded to facilitate travel of the web across the edge. The web is driven across the edge by the friction between the web and the roll surface. The surface of the web against the blade is believed to be compressed, while the surface of the web against the roll is believed to be stretched and substantially permanently expanded as it is bent over the edge of the blade by the deformation of the roll and is frictionally moved by the indented roll surface. The amount of force applied to the web and the extent to which the blade and web indent the roll can be varied by the knob 117. A greater force causes a greater modification of the web structure and causes the web to curl to a greater extent. Thus the diameter and hence the density of the resulting coils can be readily controlled. This makes for a convenient way to control the cushioning characteristics of the dunnage to match the needs of the articles being packaged.

A web deflector 130 mounted on the frame 106 rides against or in close proximity to the roll 102 just beyond the location of the blade 104, and along with a guide 132 that is in spaced opposed relation to the deflector, directs the now modified web exiting from the nip of the roll 102 and blade 104, to a shear 134. The shear includes a shear block 135 and a shear blade 136. The block has a cutting edge 137 over which the web moves from the guide 132. The shear blade is reciprocated across the face of the shear block to sever the web. To this end, the shear blade is secured by pins 138, 139 at each opposite end to a cam follower housing 140, 141, each of which surrounds a single lobe cam (one cam 142 being shown in FIG. 10) on a cam shaft 144 driven by a sprocket 146 (FIG. 11). Rotation of the cams moves the housings, which carry the shear blade past the cutting edge of the shear block. The shape of the cams provides a relatively long dwell time during which the shear blade is stationary and out of the path of the web, allowing a desired length of web to move beyond the shear; and a relatively short stroke time, during which the shear blade is moved across the web path and then back out of the path. Space is provided behind the guide 132 for the web to buckle while the shear momentarily blocks movement of the web, which is fed from the roll 102 at a continuous and constant rate. The rate (cycles per second) at which the shear blade is reciprocated can be changed by changing the size of the sprocket 146. A movable idler sprocket 148 shown in phantom in FIG. 10 illustrates the condition of a drive chain 147 for the sprocket 146 when three different sizes of sprockets are used, each of which drives the cam shaft 144 at a different speed, changing the rate at which the shear is reciprocated, thereby providing a different length to the material severed from the web, to provide coils of different weight and strength. The drive chain 147 is driven by a sprocket 143 (FIG. 11) on one end of a shaft 149, driven at its opposite end by the chain 128 and a sprocket 145.

A web slitting mechanism 150 is located on the downstream side of the shear 134, considered in the direction of web travel. This mechanism is constructed somewhat similarly to that of the first embodiment. The web is slit by adjacent discs 152, 153 spaced along parallel driven shafts 156, 158, with each shaft having alternating larger and smaller diameter portions 156L, 156S and 158L, 158S between the discs, with the larger diameter portions nesting with the smaller, and the discs being spaced to the desired width of the strips to be formed from the web. However, the nested portions are spaced peripherally to provide a gap for the web strips formed by the discs 152, 153 and do not drive the web or strips. Rather, only the cutting discs apply a driving force to the web downstream from the roll 102.

The slitting roll shafts are driven by a sprocket 160 on the shaft 156, which is driven by the chain 128 that drives the roll 102. The sprocket 160 is smaller than the sprocket 129 of roll 102, thereby rotating the shaft 156 at a greater speed. The shaft 158 is coupled by gears 157, 159 to the shaft 156 for rotation in the opposite direction at the same speed. Because the slitting discs rather than the nested shaft portions are in driving engagement with the web, the driving force is slight, thereby only slightly tensioning the web downstream from the roll 102, but enough to advance the web portion being slit away from the web, once the shear 134 has severed it.

Portions of the web immediately coil adjacent the slitting mechanism as the web is slit into longitudinal strips by the discs 152, 153, as illustrated in 36' in FIG. 10. Once the severed web portion passes completely through the slitting discs, the coils drop into the nip of a folding or crimping mechanism 170 below the slitting mechanism. In this embodiment, the folding mechanism utilizes spaced crimping wheels 172 on an idler shaft 174, and a parallel driven crimping roll 176 in direct surface contact with the wheels, forming a nip in which the coils are received for transverse creasing or folding. The wheels are rigid and have a thin periphery. The opposing roll has a yieldable surface, e.g., polyurethane having a durometer of approximately 30 to 50, and has a sufficient coefficient of friction to cause the coils 36' to move between the roll and a respective wheel, which is aligned with the middle of the coil as it drops from the slitting mechanism. The combination of the yieldable nature of the crimping roll and the relationship of the peripheries of the crimping roll and crimping wheels accommodates the folded or crimped portion of the coils 36' as the coils are frictionally forced between the two. The roll and wheels then discharge the folded coils from the apparatus. The crimping roll 176 is supported on the shaft 149 and driven by the sprocket 145 and the chain 128 that drives the roll 102. The crimping wheels 172, being in direct contact with the crimping roll 176, are driven by it. The supporting shaft 174 is omitted from FIG. 11 for clarity of the slitting mechanism behind it.

An important advantage of the embodiment of FIGS. 10 and 11 is that the web 40' is primarily fed by the roll 102 at the point of modification and is subjected only to a slight tension after it has been modified to cause it to coil. Further, this slight tension is applied only at line contact at spaced locations where the web is being slit. Thus, application of forces subsequent to the modification of the web that would tend to counteract the tendency of the web or strips to coil have been minimized.

While the invention has been described with particularity, it will be appreciated that many variations and alterations may be made or features added, without departing from the spirit and scope of the invention set forth in the claims. For example, while paper is the preferred material because of the low cost and biodegradable properties and its ability to be recycled, as well as its inherent resilient qualities, other thin, flexible, resilient materials can be formed into coils and will function in a similar manner, and provide dunnage that will protect articles in containers and can be produced at the time and place the articles are packaged so as to eliminate bulky storage. It is believed that thin, flexible, resilient plastic sheets or webs, metal foils with proper temper, or laminates of plastic, metal foils and/or paper can be used. Where paper is used, it can be coated with materials that will promote coiling. Such coatings may be heat or moisture activated to shrink or expand and when applied to one side of a web and activated will cause coiling. While the invention has been disclosed applied to a web, it will be understood that it is equally applicable to discrete sheets, which may be of a length requiring severing across the direction of travel, or may be preselected of the desired length, eliminating the need for transverse severing and requiring longitudinal slitting.

It has been found that the characteristics of paper web can be modified by forming flutes or ribbing along the length of the strips, as by embossing the paper during the travel from the roll 24 to the cutting mechanism 64. The increased bulk or effective thickness of the web results in an increased thickness of the ring R formed by the convolutions of the coil and a greater stiffness to the coil.

The paper dunnage can be dyed or printed with designs to provide distinctive packaging. Holiday colors such as green and red for christmas packing can be used as an attractive alternative to the mundane white or grey of plastic or brown of kraft paper. Existing dunnage fails to offer these options with the convenience and ease possible with the present invention.

Other uses than dunnage are also contemplated for the coils. For example, the coils can be used as animal bedding in kennels. For that application, the paper can be coated or impregnated with disinfectant, bug repellent, odor inhibitor, and/or a desirable fragrance, such as that of cedar or pine.

I claim:

1. Cushioning coils each being comprised of a thin, flexible, resilient strip stretched on one side to wind the strip into a loose coil shape having overlapping, unsecured, convolutions having a common central axis and that are resiliently deformable transversely of the axis to provide cushioning for an item packed in the coils, at least some of said cushioning coils having a fold transverse to said central axis, the fold creating an axial variation in the shape of said folded coils such that adjacent convolutions near opposite ends of the coil are spaced from each other farther than they are adjacent the fold.

2. Cushioning coils as set forth in claim 1 wherein the direction of the fold is substantially perpendicular to the central axis.

3. Dunnage for cushioning articles in a container, comprising a plurality of randomly oriented spiral coils of thin, flexible, resilient strips, said strips being stretched on one side so as to coil in a spiral shape and being substantially rigid in the axial direction of the spiral and substantially resilient in directions transverse to the axial direction to provide cushioned support for articles in a container, said coils having overlapping, unsecured, convolutions, the convolutions of each coil having a common central axis, at least some of the spiral coils including a fold transverse to an axial direction of the spiral coil, the fold creating an axial variation in a shape of the folded spiral coil such that a distance between adjacent convolutions near an end of the folded spiral coil is greater than a distance between corresponding adjacent convolutions near the fold.

4. Dunnage for cushioning articles in a container, comprising a plurality of randomly oriented, folded spiral coils, each of said coils comprised of a thin, flexible, resilient strip stretched on one side of the strip to spiral the strip into a coil shape having overlapping, unsecured convolutions, the coiled strip folded in a direction transverse to a central axis of the coiled strip creating an axial variation in the coil shape such that adjacent convolutions near opposite ends of the coiled strip are spaced from each other farther than they are adjacent the fold.

5. Dunnage for cushioning articles in a container, comprising a plurality of randomly oriented spiral coils, each coil being comprised of 30 to 100 pound basis weight kraft paper and being between about ¾ and 2½ inches wide and between about 3 and 10 inches in uncoiled length, each of said coils stretched on one side to wind the coil in overlapping, unsecured convolutions which are substantially rigid along a central axis of the spiral coil and substantially resilient in directions transverse to the central axis to provide cushioned support for articles in a container, at least some of said coils including a fold in a direction transverse to a central axis of the coil, the fold creating an axial variation in the shape of the folded coil such that a distance between adjacent convolutions near an end of the folded coil is greater than a distance between corresponding adjacent convolutions adjacent the fold.

6. A spiral coil suitable for cushioning articles in a container, formed of a thin, flexible, resilient strip stretched on one side to wind the strip into a spiral having overlapping, unsecured convolutions and being folded in a direction transverse to an axial length of the coil, the fold creating an axial variation in the shape of said coil such that adjacent convolutions near opposite ends of the coil are spaced from each other farther than they are adjacent the fold.

7. A spiral coil as set forth in claim 6 wherein the direction of the fold is substantially perpendicular to the axial length of the coil.

8. A spiral coil as set forth in claim 6 wherein the direction of the fold is at an angle of between 30 and 60 degrees relative to the axial length of the coil.

9. A spiral coil as set forth in claim 6 wherein the strip is paper.

10. A coil as set forth in claim 9 wherein the paper has a coating on one side that promotes curling of the paper.

11. A spiral coil as set forth in claim 6 wherein the strip has a width between about ¾ and 2½ inch and a length of between about 3 and 10 inches.

12. A folded spiral coil for cushioning articles in a container, the coil formed from a thin, flexible, resilient strip of paper stretched on one side to wind said strip into a coil having overlapped, unsecured convolutions, the fold being transverse to an axial length of the coil and resulting in an axial variation in the shape of said coil such that adjacent convolutions near opposite ends of the coil are spaced from each other farther than they are adjacent the fold.

\* \* \* \* \*

UNITED STATES PATENT AND TRADEMARK OFFICE
CERTIFICATE OF CORRECTION

PATENT NO. : 5,468,525
DATED : January 23, 1996
INVENTOR(S) : James B. Summers, Jr., et al.

It is certified that error appears in the above-indentified patent and that said Letters Patent is hereby corrected as shown below:

Column 109, Line 62, change "portion io" to --portion is--.

Column 112, Line 24, change "[ 4.5]" to --[4.5]--.

Column 112, Line 62, change "[(3 H-2" to --[(3H-2--.

Signed and Sealed this

Fifteenth Day of October, 1996

Attest:

BRUCE LEHMAN

Attesting Officer                Commissioner of Patents and Trademarks